United States Patent
Sato et al.

(10) Patent No.: US 9,929,682 B2
(45) Date of Patent: Mar. 27, 2018

(54) MOTOR CONTROL DEVICE

(71) Applicant: DAIKIN INDUSTRIES, LTD., Osaka-shi, Osaka (JP)

(72) Inventors: Toshiaki Sato, Kusatsu (JP); Tetsuya Itagaki, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/110,303

(22) PCT Filed: Jan. 6, 2015

(86) PCT No.: PCT/JP2015/050157
§ 371 (c)(1),
(2) Date: Jul. 7, 2016

(87) PCT Pub. No.: WO2015/105100
PCT Pub. Date: Jul. 16, 2015

(65) Prior Publication Data
US 2016/0329844 A1 Nov. 10, 2016

(30) Foreign Application Priority Data

Jan. 10, 2014 (JP) .............. 2014-003769

(51) Int. Cl.
*H02P 5/00* (2016.01)
*H02P 6/18* (2016.01)
(Continued)

(52) U.S. Cl.
CPC .............. *H02P 6/18* (2013.01); *F24H 4/02* (2013.01); *F25B 30/02* (2013.01); *F25B 31/02* (2013.01);
(Continued)

(58) Field of Classification Search
CPC ........ H02M 7/5395; H02P 21/18; H02P 6/18; H02P 2203/01; H02P 2203/03;
(Continued)

(56) References Cited

U.S. PATENT DOCUMENTS 2,526,924 A 10/1950 Andrews
5,694,010 A * 12/1997 Oomura ............ H02P 6/34
318/400.07
(Continued)

FOREIGN PATENT DOCUMENTS

CN 103348582 A 10/2013
JP 1-137168 A 5/1989
(Continued)

OTHER PUBLICATIONS

International Preliminary Report of corresponding PCT Application No. PCT/JP2015/050157 dated Jul. 21, 2016.
(Continued)

*Primary Examiner* — Eduardo Colon Santana
*Assistant Examiner* — Gabriel Agared
(74) *Attorney, Agent, or Firm* — Global IP Counselors, LLP (57) ABSTRACT

A motor control device is configured to drive a first motor that rotates a first rotation body and a second motor that rotates a second rotation body. The motor control device includes a power supply unit, inverters configured to convert an output from the power supply unit to an alternating current and supply the output to the first motor and the second motor, and a control unit configured to drive the second motor using rotor position sensorless control. The control unit may be configured to not start up the second motor during a predetermined operation in which a large current flowing through the first motor is being performed.

16 Claims, 6 Drawing Sheets (51) Int. Cl.
  *H02P 1/58* (2006.01)
  *F24H 4/02* (2006.01)
  *F25B 30/02* (2006.01)
  *F25B 31/02* (2006.01)
  *F25B 49/02* (2006.01)
  *H02P 27/06* (2006.01)

(52) U.S. Cl.
  CPC .............. *F25B 49/025* (2013.01); *H02P 1/58* (2013.01); *H02P 27/06* (2013.01); *F25B 2500/26* (2013.01); *Y02B 30/12* (2013.01)

(58) Field of Classification Search
  CPC .. H02P 27/06; Y02T 10/7241; B60L 2220/14; B60K 1/02; B62D 5/0463; B62D 5/0487
  USPC ........................................................... 318/51
  See application file for complete search history.

(56) References Cited

U.S. PATENT DOCUMENTS

| | | | | |
|---|---|---|---|---|
| 2007/0013325 A1* | 1/2007 | Kiuchi | ...................... | H02P 5/74 318/34 |
| 2010/0156333 A1* | 6/2010 | Chen | ....................... | H02P 21/18 318/400.33 |
| 2013/0094269 A1* | 4/2013 | Maeda | .................. | H02M 7/003 363/141 |
| 2013/0134910 A1* | 5/2013 | Iwashita | .................. | H02P 3/14 318/376 |
| 2013/0207586 A1* | 8/2013 | Hayashi | .................. | H02P 25/22 318/490 |
| 2014/0097776 A1* | 4/2014 | Hayashi | .................... | H02P 6/20 318/400.21 |
| 2014/0167663 A1* | 6/2014 | Ide | .......................... | H02P 6/182 318/400.09 |
| 2014/0292232 A1* | 10/2014 | Tsutsumi | ............. | H02P 29/025 318/85 |

FOREIGN PATENT DOCUMENTS

| | | |
|---|---|---|
| JP | 2001-129293 A | 5/2001 |
| JP | 2008-54811 A | 3/2008 |
| JP | 2012-159270 A | 8/2012 |
| WO | 2013/027527 A1 | 2/2013 |

OTHER PUBLICATIONS

International Search Report of corresponding PCT Application No. PCT/JP2015/050157 dated Apr. 7, 2015.
European Search Report of corresponding EP Application No. 15 73 5189.1 dated Dec. 21, 2016.

* cited by examiner

MOTOR CONTROL DEVICE

CROSS-REFERENCE TO RELATED APPLICATIONS

This U.S. National stage application claims priority under 35 U.S.C. § 119(a) to Japanese Patent Application No. 2014-003769, filed in Japan on Jan. 10, 2014, the entire contents of which are hereby incorporated herein by reference.

TECHNICAL HELD

The present invention relates to a motor control device.

BACKGROUND ART

In recent heat pump type refrigeration apparatuses and heat pump type water heaters, typically, at least one of a brushless direct current (DC) motor for a compressor and a brushless DC motor for an outdoor fan is driven using rotor position sensorless control. JP-A-2012-159270 discloses a heat pump apparatus in which a brushless DC motor for an outdoor fan is driven using the rotor position sensorless control, for example. JP-A-2012-159270 describes a method for detecting and dealing with an abnormality during control of the brushless DC motor.

SUMMARY

Technical Problem

Usually, in case one of motors performs an operation accompanying a large current, noise is readily added to a detection value of an inverter current and/or an inverter voltage used for the rotor position sensorless control. The inverter current and/or the inverter voltage are a parameter to estimate a rotor position. The noise added to these detection values makes the estimation of the rotor position incapable or unstable. Consequently, control of a motor may be hindered.

Typically, control of a brushless DC motor for a compressor uses a larger current than control of a brushless DC motor for an outdoor fan.

However, the above-described JP-A-2012-159270 does not describe how to minimize an influence on the brushless DC motor for an outdoor fan during control of the brushless DC motor for a compressor.

An object of the present invention is to provide a motor control device which drives at least one of two motors using the rotor position sensorless control and enables to control one motor using the rotor position sensorless control without a failure due to control of an operation of the other motor.

Solution to Problem

A motor control device according to a first aspect of the present invention is a motor control device that drives a first motor that rotates a first rotation body and a second motor that rotates a second rotation body. The motor control device includes a power supply unit, an inverter, and a control unit. The inverter converts an output from the power supply unit to an alternating current and supplies the output to the first motor and the second motor. The control unit drives the second motor using rotor position sensorless control. In addition, the control unit does not start up the second motor during a predetermined operation in which a large current flows through the first motor is being performed.

At the time of startup of the second motor, which is to be driven using the rotor position sensorless control, a position of the rotor cannot be found at startup of the motor. A synchronous operation that forcibly causes the motor to rotate regardless of the position of the rotor is performed to thereby start the motor. After a motor current increased enough to estimate the position of the rotor stably, the motor is driven using the rotor position sensorless control.

At startup of the motor as discussed above, a large current flows through the first motor, noise is thereby added to a detection value to detect the position of the rotor of the second motor. Due to this noise, the position cannot be detected accurately, and consequently, a startup abnormality may be caused. In particular, such an abnormality is caused observably when the negative side of a direct current (DC) bus is used as a common ground (GND) potential.

Therefore, in the motor control device, a startup abnormality of the second motor can be avoided by not starting up the second motor during the predetermined operation in which a large current flows through the first motor is being performed.

A motor control device according to a second aspect of the present invention is a motor control device that drives a first motor that rotates a first rotation body and a second motor that rotates a second rotation body. The motor control device includes a power supply unit, an inverter, and a control unit. The inverter converts an output from the power supply unit to an alternating current and supplies the first motor and the second motor with the output. The control unit drives the second motor using rotor position sensorless control. In addition, the control unit includes a determination unit that determines whether the second motor is in an abnormal state or not. Furthermore, the control unit cancels the decision of the determination unit even if the determination unit has determined that the inverter for the second motor is in an abnormal state when the second motor is in operation and the first motor performs a predetermined operation.

Due to a large current flowing through the first motor, noise is added to a detection value of an inverter current of the second motor side, a frequency of the determination of an abnormality thereby increases. However, the detected abnormality at this time is not an abnormality that leads to a damage, but this abnormality is detected erroneously and is transient due to the noise. Therefore, if the motor is stopped in accordance with each of the determinations of abnormality, a normal operation is hindered unnecessarily.

In the motor control device, an unwanted abnormal shutdown of the motor can be prevented by canceling the determination of an abnormality and continuing the operation of the motor.

A motor control device according to a third aspect of the present invention is a motor control device that drives a first motor that rotates a first rotation body and a second motor that rotates a second rotation body. The motor control device includes a power supply unit, an inverter, a, control unit, and a collective control unit. The inverter converts an output from the power supply unit and supplies the output to the first motor and the second motor. The control unit drives the second motor using rotor position sensorless control. The collective control unit collectively controls two or more control units including the above-mentioned control unit. In addition, the control unit includes a determination unit that determines whether the second motor is in an abnormal state or not. Furthermore, the control unit performs a retry action of the operation of the inverter to operate the inverter again without notifying the collective control unit of an abnormal state even if the determination unit has determined that the inverter of the second motor is in an abnormal state and temporarily stops operating the inverter when the second motor is in operation and the first motor performs a predetermined operation.

In the motor control device, for example, even if an abnormal value of an inverter current of the second motor is detected when the first motor performs the predetermined operation, this value is detected erroneously due to noise and is more likely to be transient. Therefore, an unwanted abnormal shutdown of the motor can be prevented by not determining as abnormal and by retrying the operation of the inverter.

A motor control device according to a fourth aspect of the present invention is the motor control device according to either the second aspect or the third aspect, wherein the operation of the second motor is a startup operation.

A motor control device according to a fifth aspect of the present invention is the motor control device according to any of the first aspect to the fourth aspect, wherein the first rotation body is a compressor. The predetermined operation of the first motor is a synchronous operation of the compressor in case the first motor that rotates the compressor is driven using rotor position sensorless control.

The synchronous operation of the compressor is an operation, which is performed as follows: typically, during startup of the compressor, regardless of a position of a rotor, a revolving field having a predetermined frequency is supplied by an inverter; magnetic poles of a rotor synchronize with the revolving field of the inverter; a voltage and a current to be applied to the motor can be detected; and the motor is forcibly cause to rotate until a position of the rotor can be found. During this synchronous operation, a large current flows and noise is added readily.

In view of this, in the motor control device, a startup abnormality of the second motor can be avoided by avoiding starting up the second motor during the above-mentioned synchronous operation.

Advantageous Effects of Invention

In the motor control device according to the first aspect, a startup abnormality of the second motor can be avoided by not starting up the second motor when the predetermined operation in which a large current flows through the first motor.

In the motor control device according to the second aspect or the fourth aspect, an unwanted abnormal shutdown of the motor can be prevented by canceling the determination of the abnormality and continuing the operation of the motor.

In the motor control device according to the third aspect or the fourth aspect, if for example, an abnormal value of an inverter current of the second motor is detected when the first motor performs the predetermined operation, this value is more likely to be transient. Therefore, an unwanted abnormal shutdown of the motor can be prevented by not determining as abnormal and by retrying detection of an inverter current and the operation of the inverter.

In the motor control device according to the fifth aspect, a startup abnormality of the second motor can be avoided by avoiding starting up the second motor during the synchronous operation of the first motor in case the first motor that rotates the compressor is driven using the rotor position sensorless control.

DESCRIPTION OF EMBODIMENT

The embodiment of the present invention will be described below with reference to the drawings. The embodiment below is merely a specific example of the present invention, and does not limit the technical scope of the present invention.

(1) Overview

Figure 1:
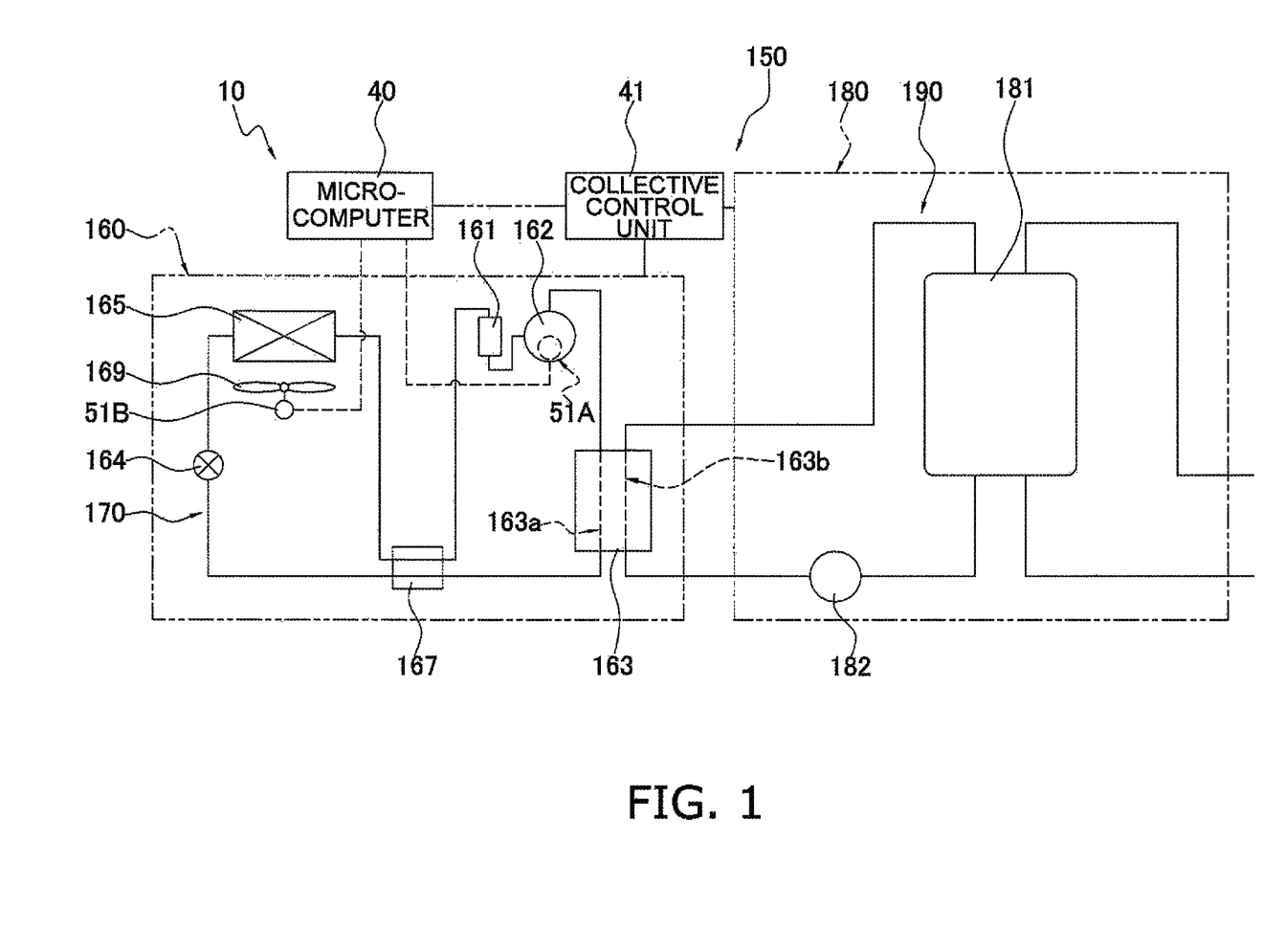
FIG. 1 is a schematic block diagram of a heat pump type water heater, to which a motor control device according to one embodiment of the present invention is mounted.

FIG. 1 is a schematic block diagram of a heat pump type water heater 150, to which a motor control device 10 according to one embodiment of the present invention is mounted. In FIG. 1, the heat pump type water heater 150 is configured with a heat pump unit 160 and a tank unit 180.

The heat pump unit 160 includes a vapor compression refrigeration circuit 170, in which an accumulator 161, a compressor 162, a refrigerant pipe 163a in a water heat exchanger 163, an expansion valve 164 as a depressurization means, and an air heat exchanger 165 are connected to each other with refrigerant piping in a circular manner.

A liquid-gas heat exchanger 167 is disposed in the refrigeration circuit 170 in order to exchange heat between a high temperature and high pressure refrigerant from the water heat exchanger 163 and a low temperature and low pressure refrigerant from the air heat exchanger 165. Specifically, heat is exchanged between a refrigerant pathway coupling the water heat exchanger 163 to the expansion valve 164 and a refrigerant pathway coupling the air heat exchanger 165 to the compressor 162.

A fan 169 is disposed at a position in which the air heat exchanger 165 faces the fan. The fan 169 sends air to the air heat exchanger 165.

The tank unit 180 includes a water circulation circuit 190 in which a tank 181, a water pipe 163b in the water heat exchanger 163 and a water circulation pump 182 are connected to each other with water circulation piping in a circular manner.

A microcomputer 40 controls the operations of the heat pump unit 160 and the tank unit 180.

The motor control device 10 controls a motor 51A housed in the compressor 162 and a motor 51B to drive the fan 169.

(1-1) System 100

Figure 2:
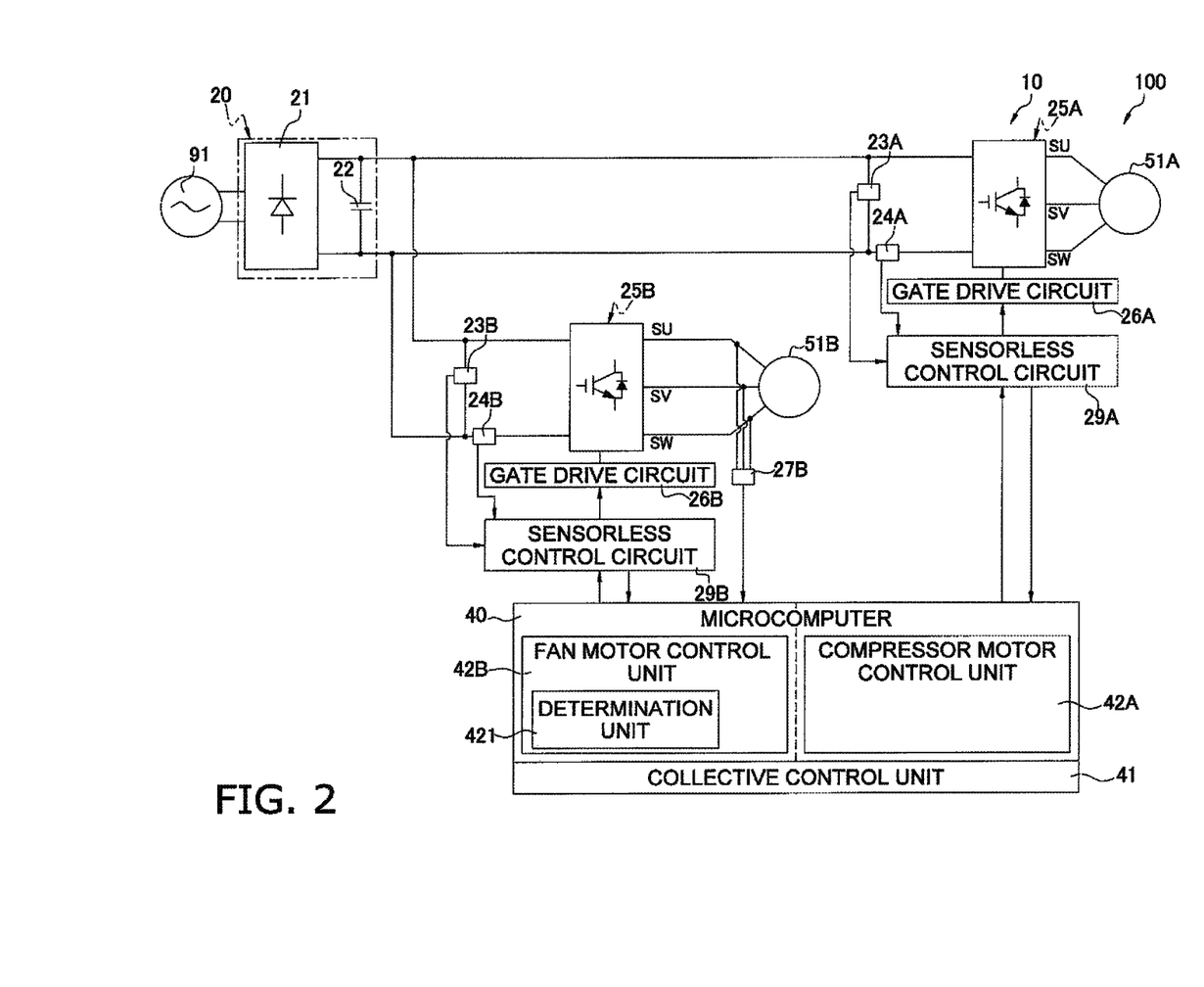
FIG. 2 is a block diagram of a system, which relates to the motor control device of FIG. 1.

FIG. 2 is a block diagram of a system 100, which relates to the motor control device 10 of FIG. 1. In FIG. 2, the motor 51A is a compressor motor, and is housed in the compressor 162 (see FIG. 1). The motor 51B is a fan motor, and drives the fan 169 (see FIG. 1). The system 100 includes an inverter 25A that supplies the motor 51A with a drive voltage and inverter 25B that supplies the motor 51B with a drive voltage.

One direct current power supply unit 20 supplies the inverter 25A and the inverter 25B with direct current voltages in parallel. In other words, the inverters share the positive side and negative side of a direct current (DC) bus. The inverter 25A is connected to a gate drive circuit 26A. The inverter 25B is connected to a gate drive circuit 26B. Furthermore, the gate drive circuit 26A is connected to a sensorless control circuit 29A. The gate drive circuit 26B is connected to a sensorless control circuit 29B.

The sensorless control circuit 29A is connected to a voltage detection unit 23A and a current detection unit 24A. The sensorless control circuit 29B is connected to a voltage detection unit 23B and a current detection unit 24B.

The microcomputer 40 is connected to an inductive voltage detection unit 27B, and the sensorless control circuits 29A and 29B. The microcomputer 40 is provided with a compressor motor control unit 42A and a fan motor control unit 42B, and is connected to a collective control unit 41.

Figure 3:
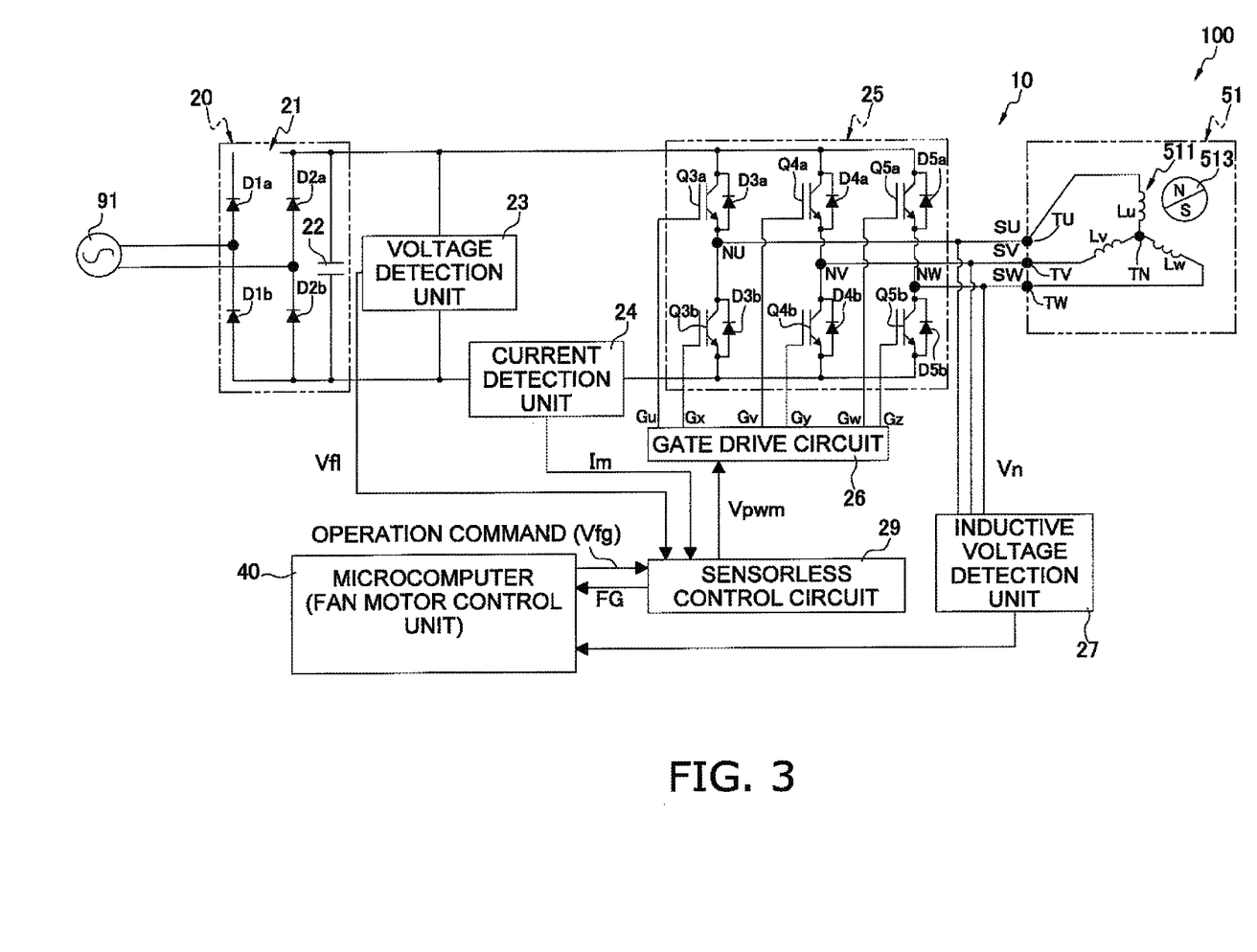
FIG. 3 is a representative circuit diagram of the motor control device of FIG. 1 and FIG. 2.

FIG. 3 is a representative circuit diagram of the motor control device 10 of FIGS. 1 and 2. In FIG. 2 discussed above, reference signs of components which relate to control of the motor 51A (i.e., a compressor motor) end in the letter capital "A", and reference signs of components which relate to control of the motor 51B (i.e., a fan motor) end in the letter capital "B". These components are referred to as the voltage detection units 23A and 23B, current detection units 24A and 24B, inverters 25A and 25B, gate drive circuits 26A and 26B, inductive voltage detection unit 27B, and sensorless control circuits 29A and 29B. For convenience of description, when same type of components are described, these letters "A" and "B" are omitted, and the above components are referred to as voltage detection unit 23, current detection unit 24, inverter 25, gate drive circuit 26, inductive voltage detection unit 27, and sensorless control circuit 29.

(1-2) Motor 51

The motor 51 is a three-phase brushless DC motor, and includes a stator 511 and a rotor 513. The stator 511 includes U-phase, V-phase, and W-phase drive coils Lu, Lv, and Lw, which are star connected to each other. One ends of the drive coils Lu, Lv, and Lw are connected to drive coil terminals TU, TV, and TW, respectively, of U-phase, V-phase, and W-phase lines extending from the inverter 25. The other ends of the drive coils Lu, Lv, and Lw are connected to each other as a terminal TN. The three-phase drive coils Lu, Lv, and Lw generate inductive voltages corresponding to the rotational speed of the rotor 513 and the position of the rotor 513 when the rotor 513 rotates.

The rotor 513 includes a permanent magnet having plural poles comprising an N-pole and an S-pole, and rotates about a rotation shaft relative to the stator 511. The rotation of the rotor 513 is output to a load via an output shaft (not illustrated) lying on the same axis as that of the rotation shaft.

The motor 51 is a permanent magnet synchronous motor. As the permanent magnet synchronous motor, an interior permanent magnet synchronous motor or a surface permanent magnet synchronous motor is selected suitably. An interior permanent magnet synchronous motor is recommendable preferably in that the interior permanent magnet synchronous motor uses reluctance torque in addition to magnet torque to achieve high torque. In addition, an inductance varies in accordance with a position of the rotor 513, thereby enabling estimation of a startup position and a rotor position sensorless operation in an ultra-low speed region.

(1-3) Motor Control Device 10

The motor control device 10, as illustrated in FIG. 3, includes a rectification unit 21 connected to a commercial power supply 91, a smoothing capacitor 22, the voltage detection unit 23, the current detection unit 24, the inverter 25, the gate drive circuit 26, the inductive voltage detection unit 27, the sensorless control circuit 29, and the microcomputer 40. These are mounted on one printed board, for example.

(2) Details of Motor Control Device 10

(2-1) Rectification Unit 21

The rectification unit 21 is configured in a bridge form by four diodes D1a, D1b, D2a, and D2b. Specifically, the diodes D1a and D1b are connected in series to each other, and the diodes D2a and D2b are connected in series to each other. Cathode terminals of the diodes D1a and D2a are both connected to the plus-side terminal of the smoothing capacitor 22, and function as a positive-side output terminal of the rectification unit 21. The anode terminals of the diodes D1b and D2b are connected to the minus-side terminal of the smoothing capacitor 22 and function as a negative-side output terminal of the rectification unit 21.

The point of connection between the diodes D1a and D1b is connected to one pole of the commercial power supply 91. The point of connection between the diodes D2a and D2b is connected to the other pole of the commercial power supply 91. The rectification unit 21 rectifies an alternating current voltage output from the commercial power supply 91 to generate a direct current power, and supplies this to the smoothing capacitor 22.

(2-2) Smoothing Capacitor 22

The smoothing capacitor 22 has one end connected to the positive-side output terminal of the rectification unit 21 and has the other end connected to the negative-side output terminal of the rectification unit 21. The smoothing capacitor 22 smoothes the voltage rectified by the rectification unit 21. Hereinafter, for convenience of description, this voltage will be referred to as a "direct current voltage Vf1".

The direct current voltage Vf1 is applied to the inverter 25 connected to the output side of the smoothing capacitor 22. In other words, the rectification unit 21 and the smoothing capacitor 22 configure the direct current power supply unit 20 to the inverter 25.

As the smoothing capacitor 22, an electrolytic capacitor, a ceramic capacitor, or a tantalum capacitor is selected suitably. In the present embodiment, an electrolytic capacitor is used.

(2-3) Voltage Detection Unit 23

The voltage detection unit 23 is connected to the output side of the smoothing capacitor 22 and detects the voltage between the ends of the smoothing capacitor 22, that is, the value of the direct current voltage Vf1. The voltage detection unit 23 is, for example, configured with two resistors, which are connected in series to each other, being connected in parallel to the smoothing capacitor 22 to divide the direct current voltage Vf1. The voltage value at the point of connection between the two resistors is input to the sensorless control circuit 29.

(2-4) Current Detection Unit 24

The current detection unit 24 is connected to the negative-side output terminal side of the smoothing capacitor 22 between the capacitor 22 and the inverter 25. The current detection unit 24 detects a motor current Im flowing into the motor 51 after startup of the motor 51.

The current detection unit 24 may be configured, for example, with an amplifier circuit using a shunt resistor and an operational amplifier (op-amp) that amplifies the voltage between both ends of the resistor. The motor current detected by the current detection unit 24 is input to the sensorless control circuit 29.

(2-5) Inverter 25

The inverter 25 is connected to the output side of the smoothing capacitor 22. In FIG. 3, the inverter 25 includes a plurality of insulated-gate bipolar transistors (hereinafter, simply referred to as transistors) Q3a, Q3b, Q4a, Q4b, Q5a, and Q5b and a plurality of freewheeling diodes D3a; D3b, D4a, D4b, D5a, and D5b.

The transistors Q3a and Q3b, the transistors Q4a and Q4b, and the transistors Q5a and Q5b are connected in series to each other, respectively. The diodes D3a to D5b are connected in parallel to the transistors Q3a to Q5b, respectively, in such a way that the collector terminals of the transistors and the cathode terminals of the diodes are connected to each other and the emitter terminals of the transistors and the anode terminals of the diodes are connected to each other.

The direct current voltage Vf1 from the smoothing capacitor 22 is applied to the inverter 25. Additionally, the inverter 25 generates drive voltages SU, SV, and SW to drive the motor 51 as a result of the transistors Q3a to Q5b being switched on and off at timings instructed by the gate drive circuit 26. The drive voltages SU, SV and SW are output to the motor 51 from points of connection NU, NV, and NW between the transistors Q3a and Q3b, the transistors Q4a and Q4b, and the transistors Q5a mod Q5b, respectively.

(2-6) Gate Drive Circuit 26

The gate drive circuit 26 changes the on and off states of the transistors Q3a to Q5b of the inverter 25 on the basis of the drive command value Vpwm from the sensorless control circuit 29. Specifically, the gate drive circuit 26 generates gate control voltages Gu, Gx, Gv, Gy, Gw, and Gz that are applied to the gates of the transistors Q3a to Q5b so that the drive voltages SU, SV, and SW having the duty that has been determined by the sensorless control circuit 29 are output from the inverter 25 to the motor 51. The generated gate control voltages Gu, Gx, Gv, Gy, Gw, and Gz are applied to the gate terminals of the transistors Q3a to Q5b, respectively.

(2-7) Inductive Voltage Detection Unit 27

The inductive voltage detection unit 27 has an input connected to U-phase, V-phase, and W-phase drive coil terminals TU, TV, and TW of the motor 51 and has an output connected to the microcomputer 40. The inductive voltage detection unit 27 detects an inductive voltage Vn generated by the motor 51 when the motor 51 is rotating before startup of the motor 51. The microcomputer 40 calculates a pre-startup rotational speed (i.e., a rotational speed of the motor 51 before startup) of the motor 51 on the basis of the inductive voltage Vn and estimates a rotor position.

It is technically significant to provide the inductive voltage detection unit 27 in that a pre-startup rotational speed of the motor 51 is calculated and a rotor position is estimated without a predetermined mathematical model relating to the control of the motor 51 or application of a current to the motor 51, which are used to drive the motor using the rotor position sensorless control.

Consequently, the inductive voltage detection unit 27 and the microcomputer 40 detects a pre-startup rotational speed of the motor 51 and a rotor position when the motor 51 does not start up, in other words, the inverter 25 is not controlled.

A pre-startup rotational speed of the motor can be calculated on the basis of a value detected by the inductive voltage detection unit 27 if a rotor position cannot be estimated using the rotor position sensorless control, for example, if the motor 51 is used as a fan motor and the fan rotates with natural wind.

The inductive voltage detection unit 27 functions only before the motor 51 starts up and before the motor 51 is driven using the rotor position sensorless control.

(2-8) Sensorless Control Circuit 29

The sensorless control circuit 29 is connected to the voltage detection unit 23, the current detection unit 24, the gate drive circuit 26 and the microcomputer 40. The sensorless control circuit 29 is a circuit that drives the motor 51 on the basis of an operation command Vfg including a speed command sent from the microcomputer 40.

In the present embodiment, the motor 51 is driven using the rotor position sensorless control. The rotor position sensorless control is control to perform estimation of a rotor position and a rotational speed, Proportional Integral (PI) control with respect to the rotational speed, and PI control with respect to the motor current using various parameters indicating the characteristics of the motor 51, a result of the voltage detection unit 23 and a result of the current detection unit 24 after startup of the motor 51, and a predetermined mathematical model relating to the control of the motor 51. The various parameters indicating the characteristics of the motor 51 include a coil resistance of the motor 51 to be used, an inductance component, an inductive voltage, and the number of poles.

(2-9) Microcomputer 40

The microcomputer 40 is connected to the sensorless control circuit 29. The microcomputer 40 is also connected to the collective control unit 41 that collectively controls each of components (see FIGS. 1 and 2). The microcomputer 40 controls the drive of the motor 51 in accordance with whether abnormality exists or not in each of components. This microcomputer 40 functions as a determination unit. In fact, the microcomputer 40 is provided with a determination unit 421.

This microcomputer 40 is constantly supplied with a power source (not illustrated), which is different from that of the inverter 25, regardless of a drive state of the motor 51. The negative side of this power source of the microcomputer is a common potential as a ground (GNU) of the negative side of a direct current (DC) bus, the voltage detection unit, and the current detection unit.

(3) Startup Control

The microcomputer 40 compares a pre-startup rotational speed with a predetermined rotational speed before startup of the motor 51B to determine whether the pre-startup rotational speed is not less than the predetermined rotational speed. If the pre-startup rotational speed is not less than the predetermined rotational speed, it is considered that the motor 51B already rotates at a sufficient rotational speed under the influence of wind or the like, and thereby sufficient air is already sent to the air heat exchanger 165 (see FIG. 1) without driving the motor 51B. Therefore, the microcomputer 40 maintains a state in which the motor 51B does not start up.

On the other hand, if the pre-startup rotational speed is less than the predetermined rotational speed, it is considered that sufficient air is not sent to the air heat exchanger 165 (see FIG. 1) at this point. Therefore, the microcomputer 40 starts up the motor 51B.

A position of the rotor 513 cannot be found at startup of the motor when the motor 51B, which is to be driven using the rotor position sensorless control, does not rotate. A synchronous operation that forcibly causes the motor 51B to rotate regardless of the position of the rotor 513 is performed to thereby start up the motor. After a motor current increased enough to estimate a position of the rotor 513 stably, the drive of the motor 51B is switched to the rotor position sensorless control. If the motor rotates at a high rotational speed, and it is possible to estimate the rotor position on the basis of the inductive voltage detected by the inductive voltage detection unit, first, the motor is started up using the estimated rotor position. Then, the drive of the motor 51B is switched to the rotor position sensorless control.

(4) Rotor Position Sensorless Control

Figure 4:
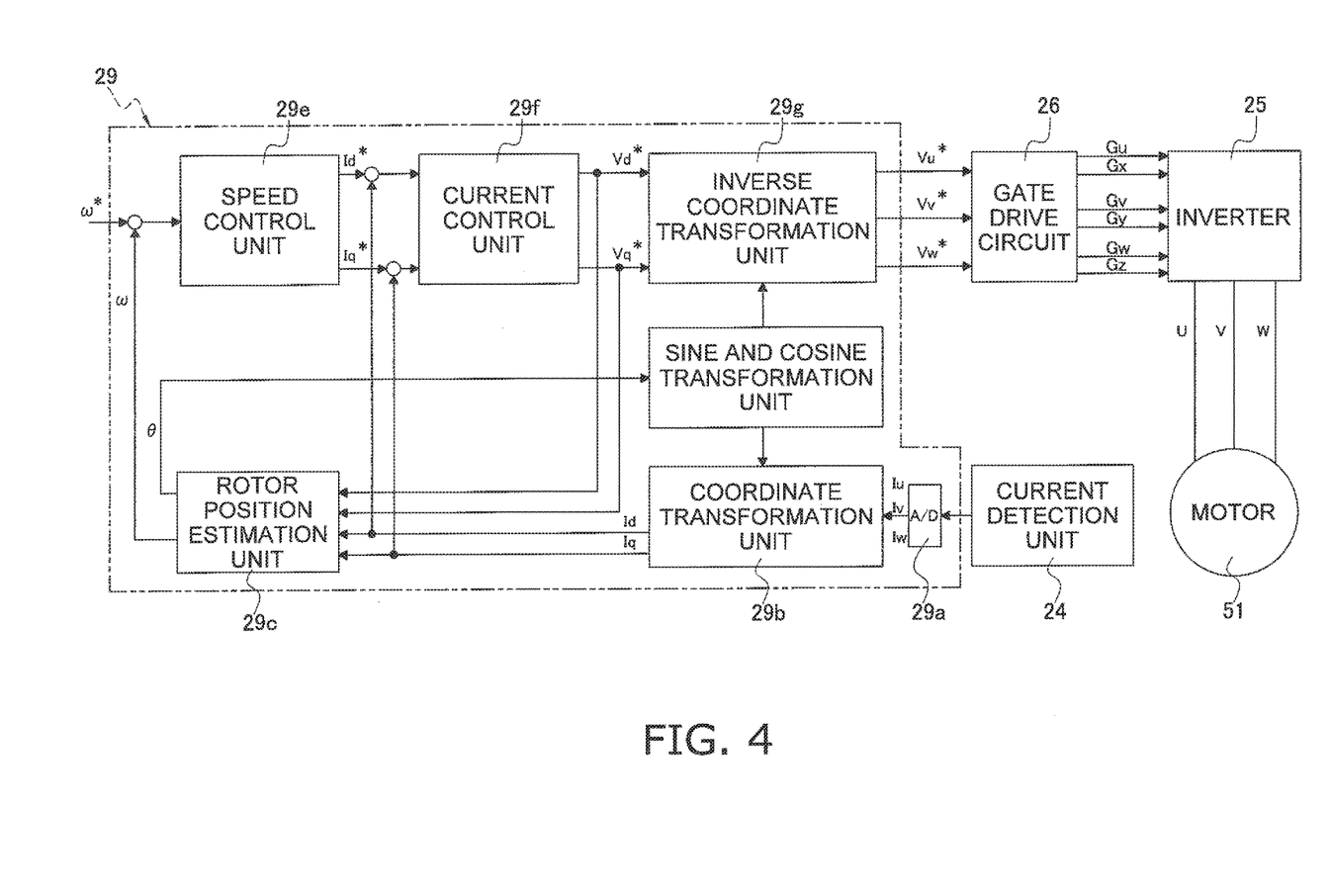
FIG. 4 is a flowchart of current vector control to estimate a rotor position without sensors.

FIG. 4 is a flowchart of current vector control to estimate a rotor position without sensors. In FIG. 4, in the sensorless control circuit 29, an analog-to-digital (AD) converter 29a measures a voltage value output from the current detection unit 24, and calculates three-phase currents values (Iu, Iv, Iw) on the basis of a state of switching.

A coordinate transformation unit 29b converts the three-phase currents values (Iu, Iv, Iw) into d-q axes currents (Id, Iq).

A rotor position estimation unit 29c calculates an angular velocity to and an electrical angle θ of the rotor 513.

A speed control unit 29e calculates current command values (Id*, Iq*) from a target angular velocity ω* and an actual angular velocity ω with PI control.

A current control unit 29f calculates d-q axes voltage command values (Vd*, Vq*) from the current command values (Id*, Iq*) and actual current values (Id, Iq) with PI control.

An inverse coordinate transformation unit 29g converts the d-q axes voltage command values (Vd*, Vq*) into three-phase voltages (Vu*, Vv*, Vw*) and outputs them as the drive command value Vpwm from the sensorless control circuit 29 to the gate drive circuit 26.

The gate drive circuit 26 applies the gate control voltages Gu, Gx, Gv, Gy, Gw, and Gz, which has been generated on the basis of the drive command value Vpwm from the sensorless control circuit 29, to the gates of the transistors Q3a to Q5b. The gate drive circuit 26 changes the on and off states of each of the transistors Q3a to Q5b of the inverter 25.

(5) Startup Prohibition Control

A position of the rotor 513 cannot be found at startup of the motor when the motor 51B, which is to be driven using the rotor position sensorless control, does not rotate. A synchronous operation that forcibly causes the motor 51B to rotate regardless of the position of the rotor 513 is performed to thereby start the motor. After a motor current increased enough to estimate the position of the rotor 513 stably, then the motor 51B is driven using the rotor position sensorless control. At startup of the motor as discussed above, a large current flows through the other motor 51A, noise is thereby added to a detection value to detect the position of the rotor 513 of the motor 51B. Due to this noise, the position cannot be detected accurately, and consequently, a startup abnormality may be caused. In particular, such an abnormality is caused observably when the negative side of the DC bus is used as a common ground (GND) potential.

Therefore, when a predetermined operation in which a large current flows through the motor 51A is being performed, the motor control device 10 performs a startup prohibition control that does not start up the motor 51B to avoid a startup abnormality of the motor 51B.

Figure 5:
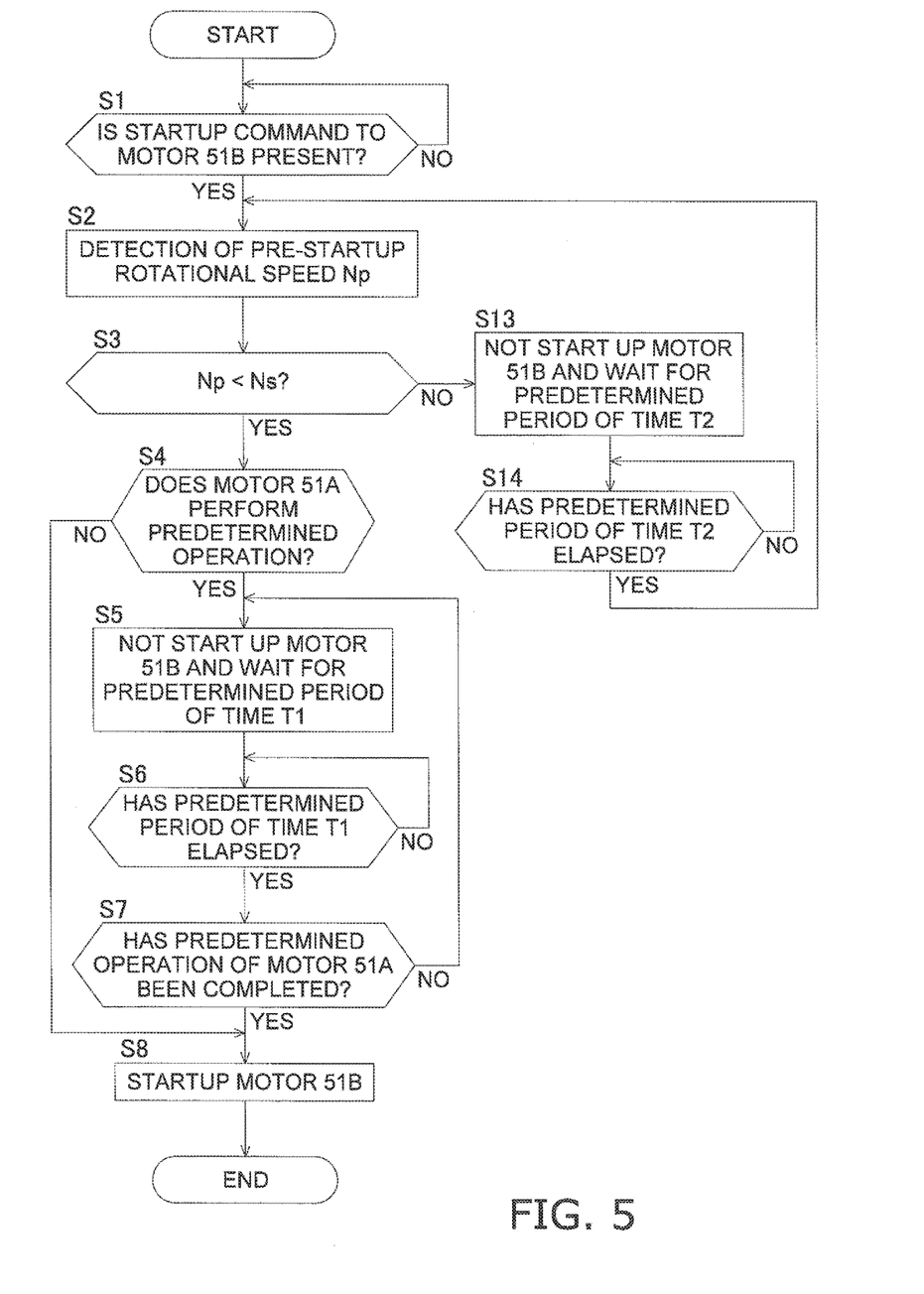
FIG. 5 is a flowchart of startup control including startup prohibition control.

FIG. 5 is a flowchart of the startup control including the startup prohibition control. As illustrated in FIG. 5, at step S1, the fan motor control unit 42B of the motor 51B side determines the presence of a startup command to start up the motor 51B from the collective control unit 41. If so, the flow proceeds to step S2, and if not, the fan motor control unit 42B continues to monitor the presence of a startup command.

Next, at step S2, the fan motor control unit 42B detects a pre-startup rotational speed Np of the motor 51B, then the flow proceeds to step S3.

Next, at step S3, the fan motor control unit 42B determines whether the pre-startup rotational speed Np of the motor 51B is less than a predetermined rotational speed Ns before the startup of the motor 51B or not. If so, the flow proceeds to step S4, and if not, the flow proceeds to step S13.

Next, at step S4, the fan motor control unit 42B determines whether the motor 51A (compressor motor) performs a predetermined operation or not. If so, the flow proceeds to step S5, and if not, the flow proceeds to step S8, and then the fan motor control unit 42B begin a startup operation of the motor 51B.

Here, the predetermined operation of the motor 51A (compressor motor) is a synchronous operation of the compressor 162, torque control of the compressor 162, or and an overload operation of compressor 162. During the synchronous operation, a voltage is applied regardless of a rotor position, a large current is needed to rotate the rotor in a synchronous state, and a phase of current is deviated, thereby allowing a reactive current to flow and regenerative action to be performed. Consequently, a potential of the negative side of the DC bus, which is the common potential with the voltage detection unit and the current detection unit, is significantly fluctuated. During the torque control, in order to minimize torque fluctuation that depends on a structure and actions of the compressor, a current fluctuation occurs, synchronizing with the torque fluctuation, and a large current flows. It is apparent that a large current flows during the overload operation. In the present embodiment, the above operations and control, in which a large current flows, are referred to as the predetermined operation. During the predetermined operation, first motor predetermined operation startup prohibition control (step S5 to S7) is performed.

Next, at step S5, the fan motor control unit 42B does not start up the motor 51B and waits for a predetermined period of time t1, then the flow proceeds to step S6.

Next, at step S6, the fan motor control unit 42B determines whether the predetermined period of time ft has elapsed or not, if so, the flow proceeds to step S7, and if not, the fan motor control unit 42B continues to measure the period of time.

Next, at step S7, the fan motor control unit 42B determines whether the predetermined operation of the motor 51A has been completed or not. If so, the flow proceeds to step S8, and if not, flow returns to step S5.

Then, at step S8, the fan motor control unit 42B begins a startup operation of the motor 51B.

If the fan motor control unit 42B determines Np is not less than Ns at step S3 and the flow proceeds to step S13, the fan motor control unit 42B does not start up the motor 51B and waits for a predetermined period of time t2, and then the flow proceeds to step S14.

Then, at step S14, the fan motor control unit 42B determines whether the predetermined period of time t2 has elapsed or not. If so, flow returns to step S2, and if not, the fan motor control unit 42B continues to measure the period of time.

As discussed above, the startup control of motor 51B includes the startup prohibition control, and gives priority to starting up the motor 51B without an influence due to the predetermined operation of the motor 51A.

(6) Control at the Time of Abnormality-Detection

During the synchronous operation of the compressor 162, the torque control of the compressor 162, and the overload operation of the compressor 162, a large current flows through the motor 51A (compressor motor) Therefore, during the control of the motor 51B (fan motor), a control result may be determined as abnormal. At this time, if this control is determined as abnormal, it is not desirable that the operation of the motor 51B is forcibly stopped even though this control is not abnormal in fact. In view of the problem as discussed above, in the present embodiment, abnormality-detection control is performed as discussed below.

Figure 6:
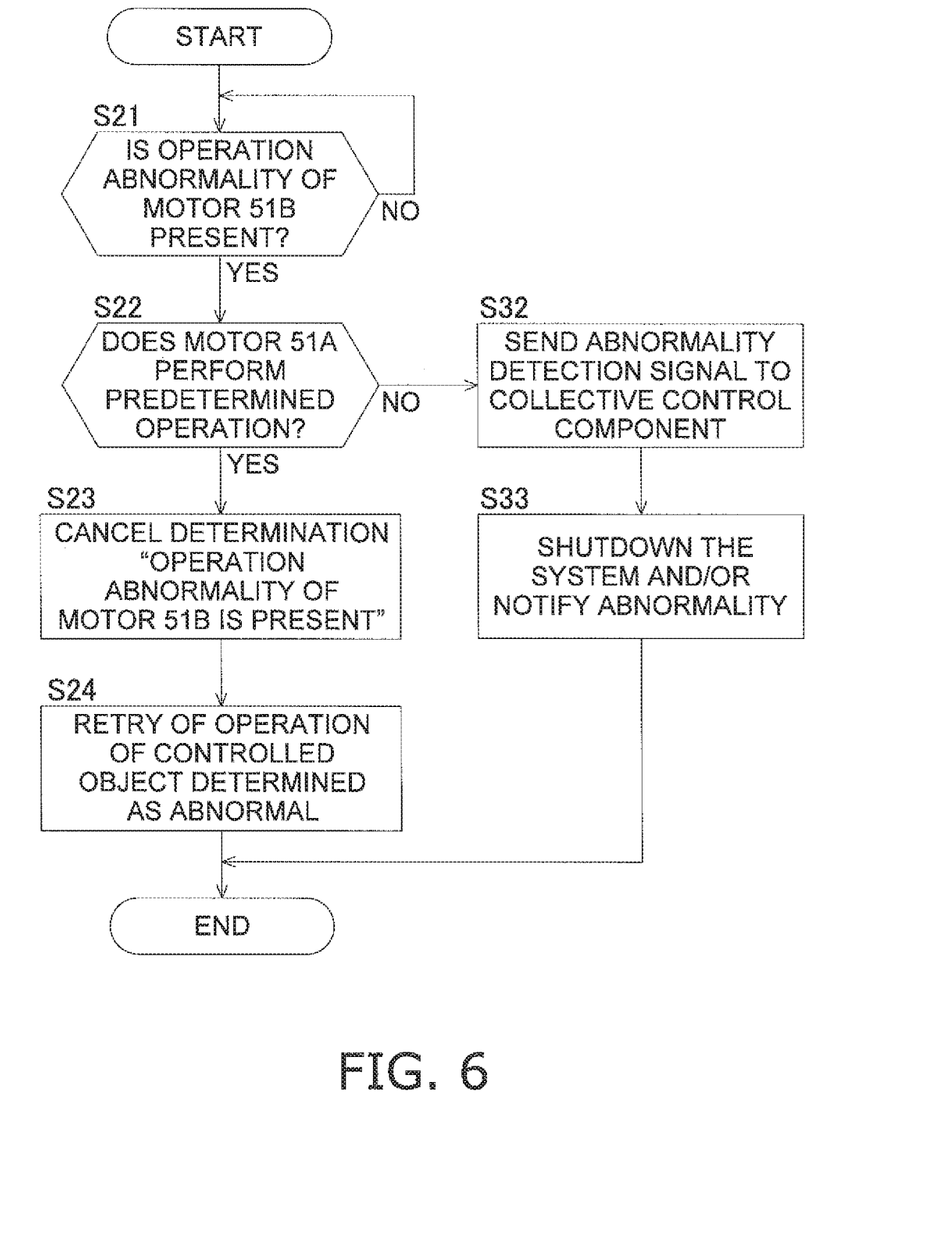
FIG. 6 is a flowchart of control at the time of abnormality-detection.

FIG. 6 is a flowchart of the abnormality-detection control. As illustrated in FIG. 6, at step S21, the fan motor control unit 42B of the motor 51B side determines the presence of an operation abnormality of the motor 51B. If so, the flow proceeds to step S22, and if not, the fan motor control unit 42B continues to monitor a presence of the operation abnormality.

Next, at step S22, the fan motor control unit 42B determines whether the motor 51A (compressor motor) is performing the predetermined operation or not, if so, the flow proceeds to step S23, and if not, the flow proceeds to step S32.

Here, the predetermined operation of the motor 51A compressor motor) is the synchronous operation of the compressor 162, the torque control of the compressor 162, or the overload operation of the compressor 162.

Next, at step S23, the fan motor control unit 42B cancels the determination at step S21, i.e., "an operation abnormality is present", then the flow proceeds to step S24.

Next, at step S24, the fan motor control unit 42B performs a retry action of the operation of the motor determined as abnormal at step S21. If an abnormal value of an inverter current of the motor 51B is detected, for example, this value is detected erroneously due to noise and is more likely to be transient. By not determining as abnormal and by performing a retry action of the operation of the inverter, an unwanted abnormal shutdown of the motor is prevented.

Meanwhile, if the fan motor control unit 42B determines that the motor 51A is not performing the predetermined operation at step S22, and the flow proceeds to step S32, at step S32 the fan motor control unit 42B sends an abnormality detection signal that indicates an abnormality is detected to the collective control unit 41. When the collective control unit 41 receives the abnormality detection signal, the collective control unit 41 determines to perform shutdown of the system 100 and/or notify an abnormality of the system 100, and sends a command to the fan motor control unit 42B.

Then, at step S33, the fan motor control unit 42B performs shutdown of the system 100 and/or notify an abnormality of the system 100.

(7) Characteristics (7-1)

In the motor control device 10, a startup abnormality of the motor 51B (fan motor) can be avoided by not starting up the motor 51B when the predetermined operation in which a large current flows through the motor 51A (compressor motor) is being performed.

(7-2)

Due to a large current flowing through the motor 51A (compressor motor), noise is added to a detection value of an inverter current of the motor 51B side. Consequently, a frequency of the determination of an abnormality increases. However, the detected abnormality at this time is not an abnormality that leads to a damage, but this abnormality is detected erroneously and is transient due to the noise. Therefore, if the motor is stopped in accordance with determination of an abnormality, a normal operation is hindered. However, in the motor control device 10, an unwanted abnormal shutdown of the motor 51B can be prevented by canceling the above determination and continuing the operation of the motor 51B.

(7-3)

In the motor control device 10, if, for example, an abnormal value of an inverter current of the motor 51B side is detected when the motor 51A (compressor motor) performs the predetermined operation, this value is detected erroneously due to noise and is more likely to be transient. An unwanted abnormal shutdown of the motor 51B can be prevented by not determining as abnormal and by retrying detection of an inverter current and the operation of the inverter.

(7-4)

In the motor control device 10, a startup abnormality of the motor 51B can be avoided by avoiding starting up the motor 51B during the synchronous operation of the motor 51A when the motor 51A, which rotates the compressor 162, is driven using the rotor position sensorless control.

(8) Others (8-1)

In the flowchart of the abnormality-detection control of FIG. 6, at step S21, the fan motor control unit 42B determines the presence of an abnormality of the motor 51B in operation. However, the operation of the motor 51B may be limited to a startup operation. In particular, at startup from a reverse rotation state, such as startup when adverse or against wind blows, detection of a current and a startup action during the change of a rotation direction tend to be unstable. Therefore, the operation of the motor is limited to a startup operation in which the rotational speed of the motor reaches a predetermined rotational speed and over in a normal rotation direction. Consequently, an effect of the present application can be achieved especially.

(8-2)

In the embodiment as discussed above, the control is described as an example, which prevents an influence on the operation of the motor 51B (fan motor) when the motor 51A (compressor motor) performs the predetermined operation accompanied by a large current.

However, the motor 51B (fan motor) may perform an operation accompanied by a large current. For example, an operation accompanied by a large current is performed at startup of the fan 169 when adverse or against wind blows. In case the motor 51A (compressor motor) is driven using the rotor position sensorless control, an abnormal synchronous operation of the motor 51A can be avoided by avoiding the synchronous operation of the motor 51A at startup of the fan 169 when adverse or against wind blows.

(8-3)

In the embodiment as discussed above, the motor 51A is a compressor motor and the motor 51B is a fan motor are described as an example.

However, the combination of motors is not limited to the example of the embodiment. If the motors 51A and 51B are compressor motors, an effect similar to that of the present application can be achieved. If the motors 51A and 51B are fan motors, or if the motor 51A is a fan motor and the motor 51B is a compressor motor, an effect similar to that of the present application can be achieved.

If the motors are motors such as a motor for a pump instead of using a compressor motor, and a fan motor, an effect similar to that of the present application can be achieved.

INDUSTRIAL APPLICABILITY

The motor control device according to the present invention is useful not only for a heat pump type water heater but also for an air conditioner.

REFERENCE SIGNS LIST

10 Motor Control Device
20 Power supply Unit
25A Inverter
25B Inverter
40 Control Unit
41 Collective Control Unit
51A Motor (First Motor)
51B Motor (Second Motor)
162 Compressor
421 Determination Unit

CITATION LIST

Patent Literature

Patent literature 1: JP-A-2012-159270

What is claimed is:

1. A motor control device configured to drive a first motor that rotates a first rotation body and a second motor that rotates a second rotation body, the motor control device comprising:
    a power supply unit;
    inverters configured to convert an output from the power supply unit to an alternating current and supply the output to the first motor and the second motor; and
    a control unit configured to drive the second motor using rotor position sensorless control,
    the control unit being further configured
    to not start up the second motor during a predetermined operation in which a large current flowing through the first motor is being performed, and
    such that a startup abnormality of the second motor is avoided by not starting up the second motor when the predetermined operation in which the large current flows through the first motor is being performed, wherein the startup abnormality is caused by a noise due to the large current flowing.

2. A motor control device configured to drive a first motor that rotates a first rotation body and a second motor that rotates a second rotation body, the motor control device comprising:
    a power supply unit;
    inverters configured to convert an output from the power supply unit to an alternating current and supply the output to the first motor and the second motor; and
    a control unit configured to drive the second motor using rotor position sensorless control,
    the control unit including a determination unit configured to determine whether the second motor is in an abnormal state or not, and
    the control unit being further configured
    to cancel the determination of the determination unit even if the determination unit has determined that the inverter for the second motor is in an abnormal state when the second motor is in operation and the first motor performs a predetermined operation, and
    such that an unwanted abnormal shutdown of the second motor is prevented by canceling the determination that the inverter for the second motor is in an abnormal state and continuing operation of the second motor.

3. A motor control device configured to drive a first motor that rotates a first rotation body and a second motor that rotates a second rotation body, the motor control device comprising:
    a power supply unit;
    inverters configured to convert an output from the power supply unit to an alternating current and supply the output to the first motor and the second motor;
    a control unit configured to drive the second motor using rotor position sensorless control; and
    a collective control unit configured to collectively control two or more control units including the control unit,
    the control unit including a determination unit configured to determine whether the second motor is in an abnormal state or not, and
    the control unit being further configured
    to perform a retry action of an operation of the inverter without notifying the collective control unit of an abnormal state even if the determination unit has determined that the inverter for the second motor is in an abnormal state when the second motor is in operation and the first motor performs a predetermined operation, and
    such that an unwanted abnormal shutdown of the second motor is prevented by not determining as abnormal and by retrying detection of an inverter current and the operation of the inverter for the second motor.

4. The motor control device according to claim 3, wherein the operation of the second motor is a startup operation.

5. The motor control device according to claim 1, wherein the first rotation body is a compressor, and in case the first motor is driven using rotor position sensorless control, the predetermined operation of the first motor is a synchronous operation of the compressor in which a voltage is applied regardless of a rotor position and a phase of current is deviated.

6. The motor control device according to claim 2, wherein the operation of the second motor is a startup operation.

7. The motor control device according to claim 6, wherein the first rotation body is a compressor, and in case the first motor is driven using rotor position sensorless control, the predetermined operation of the first motor is a synchronous operation of the compressor.

8. The motor control device according to claim 2, wherein the first rotation body is a compressor, and in case the first motor is driven using rotor position sensorless control, the predetermined operation of the first motor is a synchronous operation of the compressor in which a voltage is applied regardless of a rotor position, a large current flows through the first motor and a phase of current is deviated.

9. The motor control device according to claim 4, wherein the first rotation body is a compressor, and in case the first motor is driven using rotor position sensorless control, the predetermined operation of the first motor is a synchronous operation of the compressor.

10. The motor control device according to claim 3, wherein
the first rotation body is a compressor, and in case the first motor is driven using rotor position sensorless control, the predetermined operation of the first motor is a synchronous operation of the compressor in which a voltage is applied regardless of a rotor position, a large current flows through the first motor, and a phase of current is deviated.

11. The motor control device according to claim 1, wherein
the first rotation body is a compressor, and in case the first motor is driven using rotor position sensorless control, the predetermined operation of the first motor is a torque control of the compressor in which a current fluctuation occurs synchronizing with torque fluctuation.

12. The motor control device according to claim 2, wherein
the first rotation body is a compressor, and in case the first motor is driven using rotor position sensorless control, the predetermined operation of the first motor is a torque control of the compressor in which a current fluctuation occurs synchronizing with torque fluctuation, and a large current flows through the first motor.

13. The motor control device according to claim 3, wherein
the first rotation body is a compressor, and in case the first motor is driven using rotor position sensorless control, the predetermined operation of the first motor is a torque control of the compressor in which a current fluctuation occurs synchronizing with torque fluctuation, and a large current flows through the first motor.

14. The motor control device according to claim 1, wherein
the first rotation body is a compressor, and in case the first motor is driven using rotor position sensorless control, the predetermined operation of the first motor is an overload operation of the compressor.

15. The motor control device according to claim 2, wherein
the first rotation body is a compressor, and in case the first motor is driven using rotor position sensorless control, the predetermined operation of the first motor is an overload operation of the compressor in which a large current flows through the first motor.

16. The motor control device according to claim 3, wherein
the first rotation body is a compressor, and in case the first motor is driven using rotor position sensorless control, the predetermined operation of the first motor is an overload operation of the compressor in which a large current flows through the first motor.

* * * * *